United States Patent [19]

Martin et al.

[11] Patent Number: 5,173,037
[45] Date of Patent: Dec. 22, 1992

[54] AUTOMOTIVE FUEL PUMP

[75] Inventors: James N. Martin, Clio; John E. Creager, Linden, both of Mich.

[73] Assignee: General Motors Corporation, Detroit, Mich.

[21] Appl. No.: 803,837

[22] Filed: Dec. 9, 1991

[51] Int. Cl.$^5$ .................... F04B 17/00; F04B 35/04
[52] U.S. Cl. .................... 417/423.3; 417/423.7; 417/423.14
[58] Field of Search ............ 417/423.3, 423.7, 423.14; 310/90; 384/203, 204, 206

[56] References Cited

U.S. PATENT DOCUMENTS

| | | | |
|---|---|---|---|
| 3,418,991 | 12/1968 | Schultz et al. | 123/179 |
| 4,573,882 | 3/1986 | Watanabe et al. | 417/366 |
| 4,626,178 | 12/1986 | Terumoto | 417/366 |
| 4,718,827 | 1/1988 | Sutton et al. | 417/244 |
| 4,806,025 | 2/1989 | Kamiyama et al. | 384/204 |
| 4,834,623 | 5/1989 | Triolo et al. | 417/366 |

*Primary Examiner*—Michael Koczo
*Assistant Examiner*—Alfred Basichas
*Attorney, Agent, or Firm*—Saul Schwartz

[57] ABSTRACT

An automotive fuel pump has a tubular shell, a pump group in the shell, an end housing in the shell, and an electric motor in the shell including an armature shaft. The armature shaft has an integral annular first spherical shoulder engaging a seat of a first bearing on a partition wall of the pump group. The first bearing reacts axial thrust and radial bearing forces between the partition wall and the armature shaft and supports the armature shaft on the partition wall for rotation about the centerline of the shaft and for universal pivotal movement about the center of the first spherical shoulder. The armature shaft has an integral second spherical shoulder received in a cylindrical bearing seat of a second bearing on the end housing. The second bearing reacts only radial bearing forces between the armature shaft and the end housing in plane perpendicular to the centerline of the bearing seat whereby the armature shaft is supported on the end housing for rotation about the centerline of the armature shaft regardless of whether the centerline of the armature shaft coincides with the centerline of the cylindrical bearing seat.

4 Claims, 2 Drawing Sheets

AUTOMOTIVE FUEL PUMP

FIELD OF THE INVENTION

This invention relates to automotive fuel pumps.

BACKGROUND OF THE INVENTION

Automotive fuel pumps commonly include a cylindrical metal shell, a pump group in the shell, an end housing in the shell, and an electric motor in the shell between the pump group and the end housing. Typically, bearings on the pump group and the end housing support an armature shaft of the motor for rotation about a nominal centerline of the shell. To accommodate nonalignment of the bearings induced by manufacturing and assembly tolerances, some prior fuel pump proposals feature spherical bushings on the armature shaft received in spherical seats on the pump group and on the end housing. In another prior fuel pump proposal, nonalignment is accommodated by a spherical end of the armature shaft in a conical cavity in a sleeve on a cover of the pump group and a spherical bushing on the other end of the armature shaft received in a spherical seat on the end housing. A fuel pump according to this invention includes a novel, simplified mounting of the armature shaft on the pump group and on the end housing.

SUMMARY OF THE INVENTION

This invention is a new and improved automotive fuel pump including a cylindrical metal shell, a pump group in the shell, an end housing in the shell, and an electric motor in the shell between the pump group and the end housing. An armature shaft of the motor has an integral annular first spherical shoulder between a first end of the shaft and an armature winding on the shaft and an integral annular second spherical shoulder adjacent a second end of the armature shaft on the opposite side of the armature winding. The first spherical shoulder seats in a first bearing on a partition wall of the pump group which reacts axial thrust and radial bearing loads and the second spherical shoulder is closely received in cylindrical bearing on the end housing which reacts only radial bearing loads. The first and second bearings rotatably support the ends of the armature shaft on the pump group and the end housing. The first bearing also supports the armature shaft for universal pivotal movement about the center of the first spherical shoulder. Universal pivotal movement of the armature shaft accommodates relative lateral offset between the first and second bearings due to manufacturing and assembly tolerance while the first and second spherical shoulders prevent the armature shaft from being stressed or loaded in a beam bending mode between the bearings.

DESCRIPTION OF PREFERRED EMBODIMENTS

Figure 1:
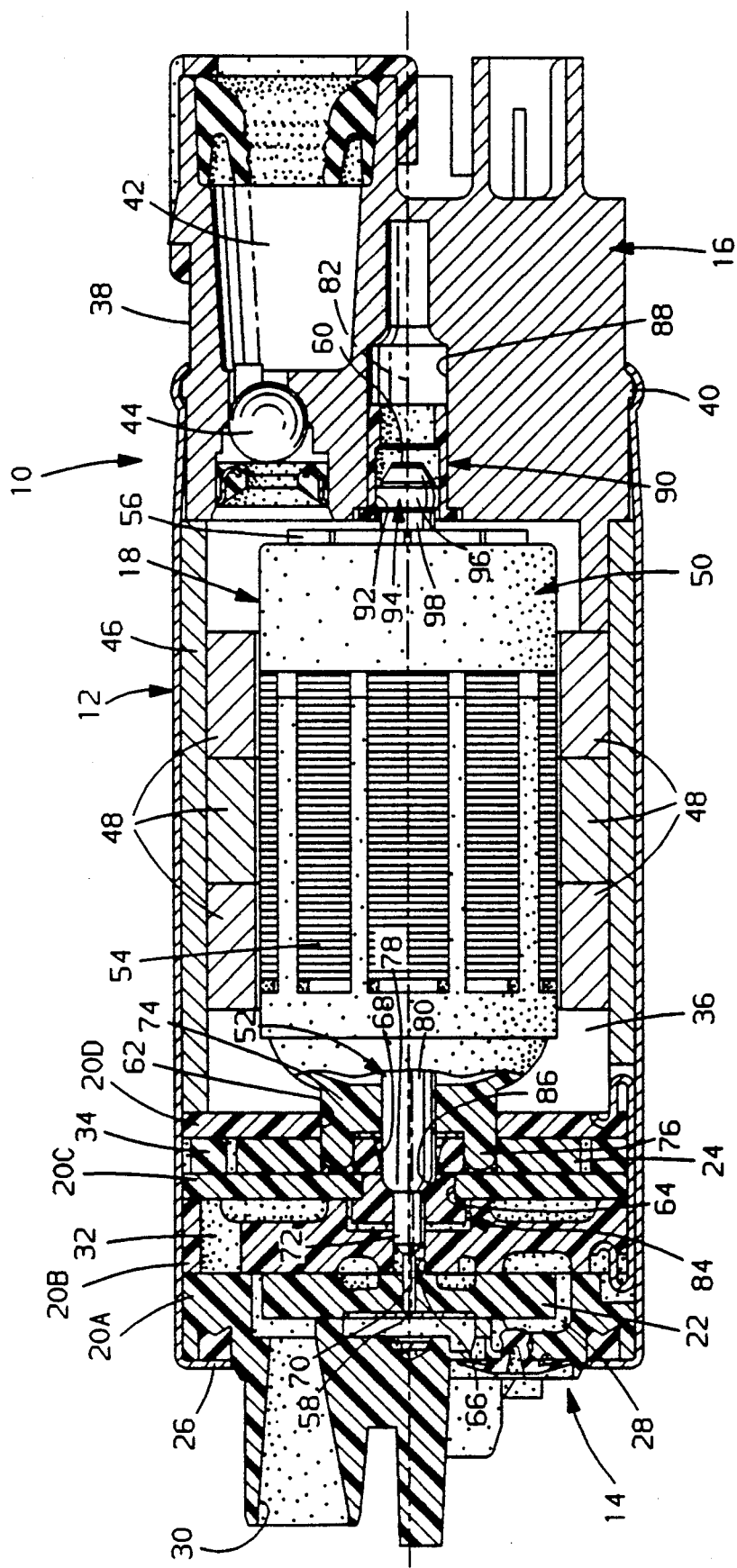
FIG. 1 is a longitudinal sectional view of an automotive fuel pump according to this invention.
Figure 2:
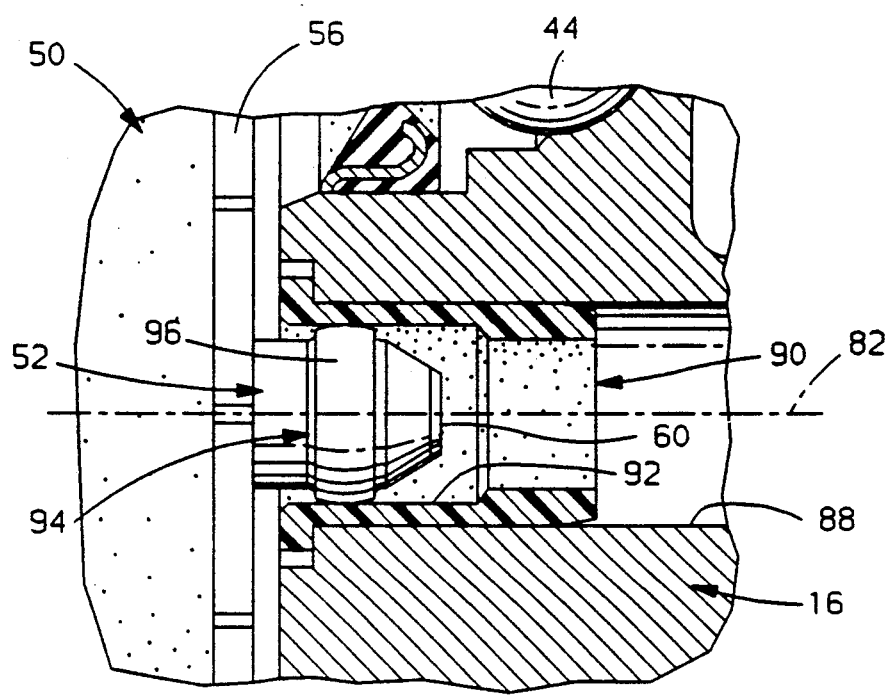
FIG. 2 is an enlarged view of a portion of FIG. 1.

Referring to FIG. 1, an automotive fuel pump (10) according to this invention includes a tubular aluminum shell (12) open at opposite ends and, inside the shell, a pump group (14), an end housing or brush holder (16), and an electric motor (18) between the pump group and the end housing. The pump group (14) may be as described in U.S. Pat. No. 4,718,827, issued Jan. 12, 1988 and assigned to the assignee of this invention, but other pump groups are contemplated within the scope of this invention.

The pump group (14) includes a plurality of generally disc-shaped partition walls (20A-D), a low pressure impeller (22), and a high pressure impeller (24). The partition wall (20A) closes the left open end of the shell (12) and is sealed against a lip (26) of the shell. The low pressure impeller (22) is disposed in a chamber (28) between the partition walls (20A,20B) and has a plurality radial vanes, not shown, around its circumference. An inlet (30) through the partition wall (20A) and a discharge (32) through the partition wall (20B) each communicate with the chamber (28)

The high pressure impeller (24) and a cam ring (34) around the impeller are disposed between the partition walls (20C-20D). Rollers, not shown, in pockets on the impeller bear against the cam ring and define a plurality of pumping chambers around the impeller (24). The discharge (32) in the partition wall (20B) communicates with an inlet, not shown, in the partition wall (20C) to the pumping chambers. A discharge, not shown, through the partition wall (20D) likewise communicates with the pumping chambers. The impellers (22,24) pump fluid from the inlet (30) at low pressure to a center chamber (36) at high pressure in the shell (12) between the pump group (14) and the end housing (16).

The end housing (16) closes the right end of the shell (12) and includes an outside cylindrical wall (38) facing the shell and an annular shoulder (40) over which the shell is crimped for retention of the end housing in the shell. Fluid at high pressure is discharged from the pump (10) through a passage (42) in the end housing (16) which opens into the center chamber (36) of the shell. A check valve (44) in the passage (42) prevents back flow when the pump is off.

The electric motor (18) is disposed in the center chamber (36) and includes a tubular steel flux ring (46). The flux ring is nonrotatably retained in the shell (12) by the end housing (16) and clamps the partition walls (20A-D) against the lip (26) on the shell. A plurality of field magnets (48) are rigidly attached to the flux ring (46). An armature (50) of the motor (18) includes an armature shaft (52), an armature winding (54) on the armature shaft, and a commutator (56). Brushes, not shown, on the end housing (16) are pressed against the commutator (56) by springs, not shown, behind the brushes.

The armature shaft (52) has a first end (58) on one side of the winding (54) and a second end (60) on the other side of the winding. The armature shaft projects through a first aperture (62) in the partition wall (20D), a smaller second aperture (64) in the partition wall (20C), and a still smaller third aperture (66) in the partition wall (20B). The armature shaft (52) also projects through a tapered clearance hole (68) in the high pressure impeller (24). A non-cylindrical drive portion (70) of the armature shaft adjacent the first end (58) thereof is received in a socket in the low pressure impeller (22) whereby the impeller is rotatable as a unit with the armature shaft.

An intermediate diameter segment (72) of the armature shaft adjacent the drive portion (70) is a loose, non-bearing fit in the third aperture (66). A left end (74) of the armature winding (54) projects into the first aperture (62) and has a plurality of lugs (76) on its axial end. The lugs (76) are received in corresponding ones of a plurality of sockets in the high pressure impeller (24) whereby the high pressure impeller is rotatable as a unit with the armature winding and with the armature shaft.

The armature shaft (52) has an integral annular first spherical shoulder (78) between the intermediate diameter segment (72) and a full diameter segment (80) of the shaft adjacent the winding (54). The center of the spherical shoulder is located on a longitudinal centerline (82) of the armature shaft generally in the plane of the partition wall (20C). A first bearing (84) is closely received in the second aperture (64) in the partition wall (20C) and has a socket-like seat (86) engaging the first spherical shoulder. The seat (86) reacts longitudinal thrust loads from the shaft to the partition wall (20C) induced by the brush springs, by magnetic bias, and by gravity in applications where the fuel pump (10) is mounted vertically. The seat (86) also reacts radial bearing loads from the shaft to the partition wall (20C) for rotatably supporting the first end (58) of the armature shaft on the pump group. The seat (86) is complementary to the first spherical shoulder (78) but other shapes, such as conical, are contemplated.

The end housing (16) has a bore (88) therein which closely receives a second bearing (90) having a cylindrical bearing seat (92) therein. An integral annular second spherical shoulder (94) on the armature shaft (52) near the second end (60) thereof is relatively closely received in the cylindrical seat (92). An outer surface (96) of the second spherical shoulder (94) is a segment of the surface of a sphere the center of which is located on the centerline (82) of the armature shaft. The outer surface (96) is symmetric on opposite sides of a plane perpendicular to the centerline (82) of the armature shaft through the center of the second spherical shoulder.

The second spherical shoulder (94) contacts or bears against the cylindrical bearing seat (92) at the points of tangency of outer surface (96) to the bearing seat (92) which points define a circle always located in a plane perpendicular to the centerline of the cylindrical bearing seat regardless of whether the centerline (82) of the armature shaft coincides with the latter or not. The bearing seat (92) reacts only radial bearing loads from armature shaft to the end housing for rotatably supporting the second end (60) of the armature shaft on the end housing (16).

In operation, durability and quietness are enhanced when the centers of the pump group (14) and of the end housing (16), and therefore the centers of the bearings (84,90) thereon, coincide with the longitudinal centerline of the shell (12). As a result of accumulation of dimensional tolerances in the shell (12), in the elements of the pump group (14), and in the end housing (16), that condition does not often obtain. Instead, the centers of the pump group and the end housing are frequently laterally offset relative to each other which offset could induce armature shaft loading in a beam bending mode between the bearings.

The bearings (84,90) in the fuel pump (10) according to this invention accommodate nonalignment of the centers of the pump group (14) and end housing (16) without loading the armature shaft (52) in a beam bending mode between the bearings (84,90). Specifically, as the end housing (16) is assembled over the second end (60) of the armature shaft (52), any lateral offset between the centers of the pump group (14) and the end housing (16) effects universal pivotal movement of the armature shaft about the center of the first spherical shoulder (78). Concurrently, the second spherical shoulder (94) rotates within the cylindrical bearing seat (92) while maintaining contact with the latter only at the aforesaid points of tangency therewith because of the symmetry of the outside surface (96) on opposite sides of the plane perpendicular to the centerline of the armature shaft through the center of the shoulder (94).

Figure 3:
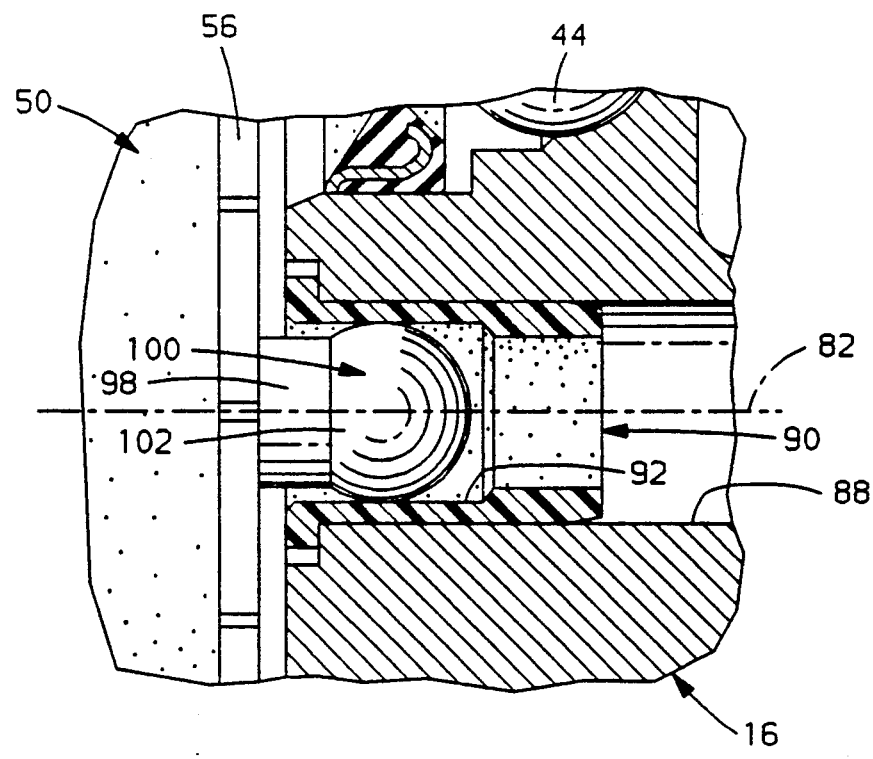
FIG. 3 is similar to FIG. 2 but illustrating a modified embodiment of the automotive fuel pump according to this invention.

Referring to FIG. 3, a modified fuel pump according to this invention, identical to the fuel pump described above except as follows, includes an armature shaft having a shank (98) and an integral spherical second end (100) the diameter of which exceeds the diameter of the shank. The spherical end (100) has an outer surface (102) which is symmetric for equal distances on opposite sides of a plane perpendicular to the centerline (82) of the armature shaft through the center of the spherical end (100) up to where the outer surfaces merges with the shank.

The spherical end (100) is received in the cylindrical bearing seat (92) and engages the latter at the points of tangency of the outer surface (102) to the cylindrical bearing seat. The spherical end (100) cooperates with the bearing seat (92) in rotatably supporting the second end of the armature shaft on the end housing (16) while accommodating the aforesaid universal pivotal movement of the armature shaft about the center of the first spherical bearing.

We claim:

1. An automotive fuel pump comprising:
a tubular shell,
a pump group in said shell at a first end thereof including an impeller and a partition wall,
an end housing in said shell at a second end thereof,
an electric motor in said shell including an armature shaft,
means defining a drive end on said armature shaft adjacent a first end thereof drivingly connected to said impeller whereby said impeller is rotatable as a unit with said armature shaft,
means defining an integral annular first spherical shoulder on said armature shaft axially inboard of said drive end and having a center on a longitudinal centerline of said armature shaft,
a first bearing in an aperture in said partition wall having a bearing seat engageable on said first spherical shoulder and being operative to react axial thrust and radial bearing forces between said armature shaft and said partition wall whereby said armature shaft is supported on said partition wall for rotation about said centerline of said armature shaft and for universal pivotal movement about said center of said first spherical shoulder,
means defining an integral second spherical shoulder in said armature shaft adjacent a second end thereof having a center on said centerline of said armature shaft and being symmetric on opposite sides of a plane perpendicular to said centerline of said armature shaft through said center of said second spherical shoulder, and
a second bearing on said end housing having a cylindrical bearing seat closely receiving said second annular shoulder operative to react only radial bearing forces between said armature shaft and said end housing in a plane perpendicular to a longitudinal centerline of said cylindrical bearing seat whereby said second end of said armature shaft is supported on said end housing for rotation about said centerline of said armature shaft.

2. The automotive fuel pump recited in claim 1 wherein said bearing seat on said first bearing includes a spherical surface complementary to said first spherical shoulder on said armature shaft.

3. The automotive fuel pump recited in claim 1 wherein said means on said armature shaft defining said integral second spherical shoulder adjacent said second end thereof includes an integral annular shoulder around said circumference of said armature shaft having a diameter exceeding said diameter of said armature shaft on opposite sides of said annular shoulder and an outer surface defining a segment of a sphere centered on said centerline of said armature shaft and symmetric on opposite sides of a plane perpendicular to said centerline of said armature shaft through said center of said outer surface spherical segment.

4. The automotive fuel pump recited in claim 1 wherein said means on said armature shaft defining said integral second spherical shoulder adjacent said second end thereof includes means defining a cylindrical shank on said armature shaft, and means defining an integral upset end on said armature shaft at a distal end of said cylindrical shank including a spherical outer surface having a center on said centerline of said armature shaft and being symmetric on opposite sides of a plane perpendicular to said centerline of said armature shaft through said center of said spherical outer surface.

* * * * *